(12) United States Patent
Sakamoto et al.

(10) Patent No.: US 11,543,591 B2
(45) Date of Patent: Jan. 3, 2023

(54) OPTICAL MULTIPLEXER AND RGB COUPLER

(71) Applicant: Nippon Telegraph and Telephone Corporation, Tokyo (JP)

(72) Inventors: Junji Sakamoto, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/263,301

(22) PCT Filed: Aug. 1, 2019

(86) PCT No.: PCT/JP2019/030346
§ 371 (c)(1),
(2) Date: Jan. 26, 2021

(87) PCT Pub. No.: WO2020/031865
PCT Pub. Date: Feb. 13, 2020

(65) Prior Publication Data
US 2021/0165163 A1    Jun. 3, 2021

(30) Foreign Application Priority Data

Aug. 10, 2018  (JP) .............................. JP2018-151635

(51) Int. Cl.
*G02B 6/28* (2006.01)
*G02B 6/12* (2006.01)
(Continued)

(52) U.S. Cl.
CPC ........... *G02B 6/2813* (2013.01); *G02B 6/125* (2013.01); *G02B 6/12007* (2013.01);
(Continued)

(58) Field of Classification Search
None
See application file for complete search history.

(56) References Cited

U.S. PATENT DOCUMENTS

2003/0219188 A1* 11/2003 Doi .................. G02F 1/225
                                                  385/11
2004/0105677 A1*  6/2004 Hamada ............. G02F 1/313
                                                  398/79
(Continued)

FOREIGN PATENT DOCUMENTS

JP    2002-514783 A       5/2002
JP    2002-286952 A   *  10/2002
(Continued)

OTHER PUBLICATIONS

T. Katsuyama et al. Extremely small red-green-blue beam combiners for compact projection-type displays. Proc. SPIE 9272, Optical Design and Testing VI, 927203, Nov. 5, 2014. (Year: 2014).*

(Continued)

*Primary Examiner* — Michael Stahl
(74) *Attorney, Agent, or Firm* — Workman Nydegger

(57) ABSTRACT

An optical multiplexer that extends a transmission bandwidth of light is achieved. The present invention provides an optical multiplexer constructed of a multimode waveguide to which two single mode input waveguides are connected at a distance and two single mode output waveguides connected at a distance to a surface opposite a surface to which the input waveguides of the multimode waveguide are connected, in which a width of the multimode waveguide is smaller than widths of the two input waveguides plus a distance between the input waveguides, and the input waveguides are connected to the multimode waveguide and the multimode waveguide is connected to the output waveguides via tapered waveguides, respectively.

9 Claims, 15 Drawing Sheets

(51) Int. Cl.
    *G02B 6/125* (2006.01)
    *G02B 6/293* (2006.01)

(52) U.S. Cl.
    CPC ......... *G02B 6/2821* (2013.01); *G02B 6/2938* (2013.01); *G02B 6/29344* (2013.01); *G02B 6/12016* (2013.01); *G02B 6/12033* (2013.01); *G02B 2006/12164* (2013.01)

(56) References Cited

U.S. PATENT DOCUMENTS

| | | | | |
|---|---|---|---|---|
| 2008/0273829 | A1* | 11/2008 | Saida | G02B 6/2804 385/14 |
| 2011/0305412 | A1* | 12/2011 | Sugiyama | G02F 1/035 385/2 |
| 2012/0068609 | A1* | 3/2012 | Ide | G02B 6/12004 315/152 |
| 2019/0056552 | A1* | 2/2019 | Sakamoto | G02B 6/12007 |
| 2019/0107675 | A1* | 4/2019 | Katsuyama | G03B 33/08 |

FOREIGN PATENT DOCUMENTS

| | | | |
|---|---|---|---|
| JP | 5979653 B2 | * | 8/2016 |
| JP | 2017-111202 A | | 6/2017 |
| WO | 2010/137661 A1 | | 12/2010 |
| WO | WO 2015/133344 A1 | * | 9/2015 |
| WO | 2017/142076 A1 | | 8/2017 |

OTHER PUBLICATIONS

L. Spiekman et al. Extremely small multimode interference couplers and ultrashort bends on InP by deep etching. IEEE Photonics Technology Letters, 6:8:1008-1010, Aug. 1994. (Year: 1994).*

C. Truong et al. A design of triplexer based on a 2 × 2 butterfly MMI couplerand a directional coupler using silicon waveguides. Optics Communications, 312:57-61, Feb. 2014. (Year: 2014).*

G. Sui et al. Flexible broadband white light multimode interference coupler. Optics Express, 29:19:29730-29744, Sep. 2021. (Year: 2021).*

Akira Nakao et al., *Integrated Waveguide-Type Red-Green-Blue Beam Combiners for Compact Projection-Type Displays*, Optics Communications, 330, 2014, pp. 45-48.

Yoshinori Hibino, *Arrayed-Waveguide-Grating Multi/Demultiplexers for Photonic Networks*, IEEE Circuits & Devices, Nov. 2020, pp. 21-27.

Akira Himeno et al., *Silica-Based Planar Lightwave Circuits*, IEEE Journal of Selected Topics in Quantum Electronics, vol. 4, No. 6, Nov./Dec. 1998, pp. 913-924.

Junji Sakamoto et al., *Compact and Low-Loss RGB Coupler Using Mode-Conversion Waveguides*, Optics Communications 420, 2018, pp. 46-51.

Lucas B. Soldano et al., *Optical Multi-Mode Interference Devices Based on Self-Imaging Principles and Applications*, Journal of Lightwave Technology, vol. 13, No. 4, Apr. 1995, pp. 615-627.

Yohei Sakamaki et al., *New Optical Waveguide Design Based on Wavefront Matching Method*, Journal of Lightwave Technology, vol. 25, No. 11, Nov. 2007, pp. 3511-3518.

\* cited by examiner

520nm

570nm

620nm

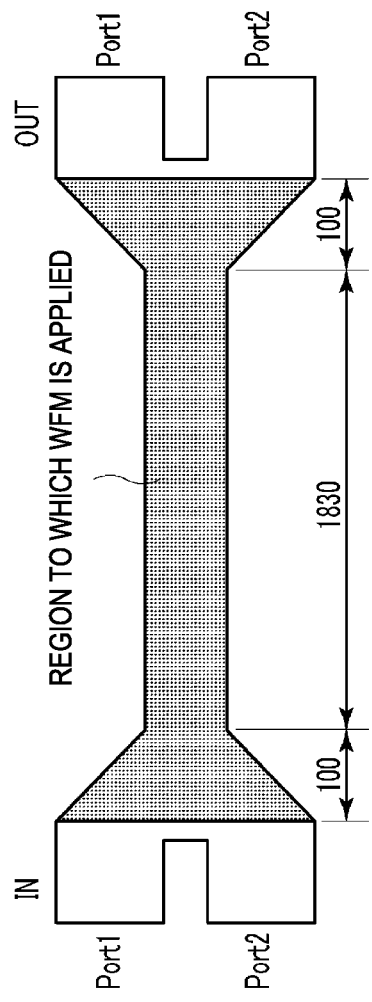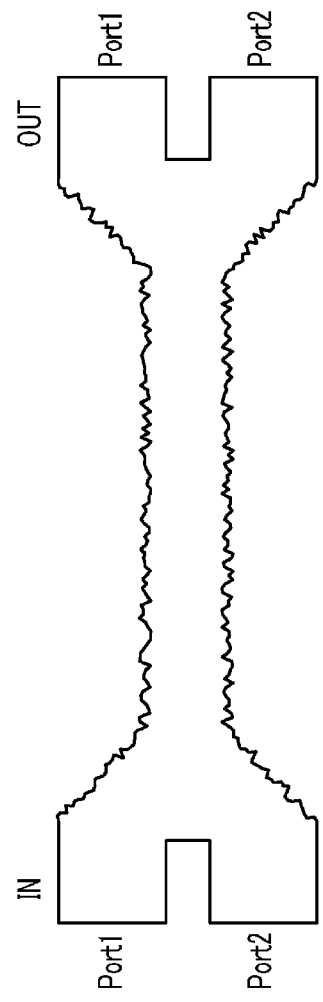
Fig. 10 (a)
Fig. 10 (b)

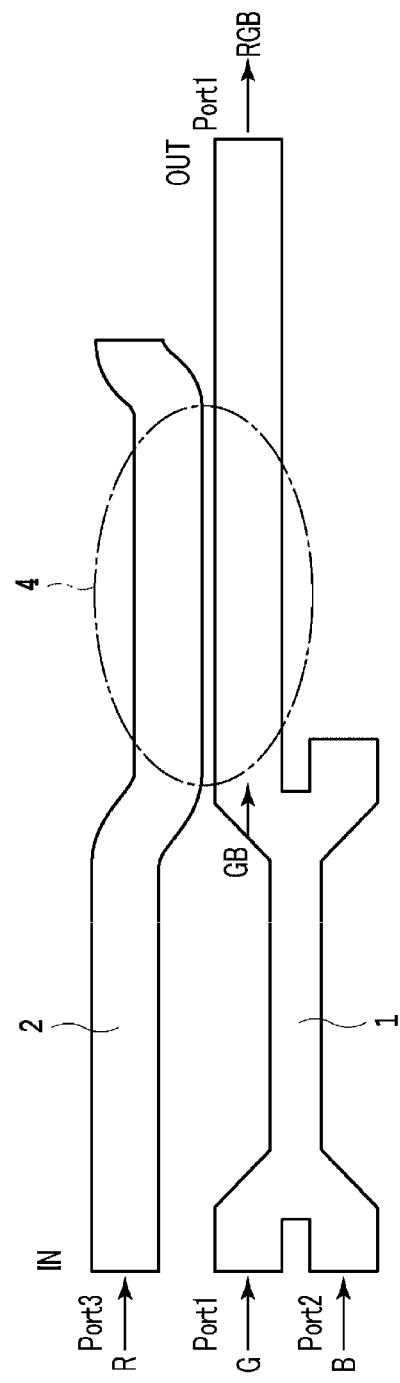

OPTICAL MULTIPLEXER AND RGB COUPLER

TECHNICAL FIELD

The present invention relates to an optical multiplexer that extends transmission bandwidths of light and an RGB coupler that multiplexes three primary color light beams using the optical multiplexer.

BACKGROUND ART

Conventionally, RGB coupler modules using a quartz-based planar lightwave circuit (PLC) have been attracting attention as circuit elements that multiplex three primary color light beams of visible light for spectacle type terminals or projectors (e.g., see Non-Patent Literature 1). In the optical communication field, filters and switches for carrying out wavelength multiplex transmission using a single optical fiber are being implemented using a PLC (e.g., see Non-Patent Literatures 2 and 3).

The PLC creates a core on a planar substrate of Si or the like through patterning using photolithography or the like or through reactive ion etching processing, and fills the surrounding area with a clad having a lower refractive index than that of the core to form an optical waveguide. The PLC features a high transmittance and can implement a low loss optical functional circuit by combining a plurality of basic optical circuits such as a directional coupler or a Mach-Zehnder interferometer. Since the PLC is also transparent to visible light (propagation loss is small), the PLC is used for an RGB coupler module for multiplexing red (R) light, green (G) light and blue (B) light, which are three primary colors of light (e.g., see Non-Patent Literatures 1 and 4), and the development of the PLC in the video field is under consideration.

The definition of R, G and B in the video field is standardized by the International Telecommunication Union (ITU), and ITU-R Recommendation BT.709, which is a standard of high vision video and ITU-R Recommendation BT.2020 (hereinafter referred to as "BT.2020"), which is ultra-high definition television video are defined. In order to set an inclusion ratio of pointer color, which is colorimetric data representing a color gamut to 99.9%, BT.2020 defines wavelengths of RGB as R=630 nm, G=532 nm and B=467 nm respectively.

As red (R) and blue (B) light sources, semiconductor lasers corresponding to the aforementioned wavelengths are commercially available. On the other hand, as green (G) light sources, semiconductor lasers having a wavelength of 515 nm are commonly used. A small number of green lasers having a wavelength near 520 nm are also sold. In order to cover all green lasers, filter characteristics of an RGB coupler preferably cover a range from the shortest wavelength of 515 nm of currently commercially available green lasers to the wavelength of 532 nm defined in BT.2020. Considering that a central wavelength of an RGB coupler changes depending on manufacturing error and an oscillation wavelength of a laser changes depending on manufacturing conditions and temperature or the like, the RGB coupler preferably includes a margin in wavelength type on the order of ±5 nm in addition to the aforementioned wavelength region.

To summarize the above, propagation loss preferably falls within 1 dB at R=630±10 nm, G=523.5±18.5 nm and B=467±10 nm as filter characteristics of the RGB coupler.

FIG. 1 illustrates a configuration of an RGB coupler using a conventional mode coupler (see Non-Patent Literature 4). Green (G) light propagating from an IN Port 1 to an OUT Port 1 is multiplexed in a waveguide from an IN Port 2 to the OUT Port 1 through which blue (B) light propagates via a mode coupler A and red (R) light propagating from an IN Port 3 to the OUT Port 1 is multiplexed in the above waveguide via a mode coupler B. A PLC constituting the RGB coupler has a core film thickness of 2.0 µm, a relative refractive index difference of 4=0.77%, and the three waveguides have a core width W is 1.5 µm. An interval G between the waveguide and the mode coupler is 1.5 µm, a width Wa of the mode coupler A is 6.55 µm, a length La is 1700 µm, a width Wb of the mode coupler B is 7.25 µm and a length Lb is 850 µm.

CITATION LIST

Non-Patent Literature

Non-Patent Literature 1: A. Nakao, et al., "Integrated waveguide-type red-green-blue beam combiners for compact projection-type displays", Optics Communications 330 (2014) 45-48

Non-Patent Literature 2: Y. Hibino, "Arrayed-Waveguide-Grating Multi/Demultiplexers for Photonic Networks," IEEE CIRCUITS & DEVICES, November, 2000, pp. 21-27

Non-Patent Literature 3: A. Himeno, et al., "Silica-Based Planar Lightwave Circuits," J. Sel. Top. Q.E., vol. 4, 1998, IEEE, pp. 913-924

Non-Patent Literature 4: J. sakamoto, et al., "Compact and low-loss RGB coupler using mode-conversion waveguides", Optics Communications 420 (2018) 46-51

Non-Patent Literature 5: L. B. Soldano and E. C. M. Pennings, "Optical multi-mode interference devices based on self-imaging: Principles and applications," J. Lightwave Technol., vol. 13, 1995, IEEE, pp. 615-627

Non-Patent Literature 6: Y. Sakamaki, T. Saida, T. Hashimoto, and H. Takahashi, "New Optical Waveguide Design Based on Wavefront Matching Method", J. Lightwave Technology, vol. 25, No. 11, November 2007, IEEE, pp. 3511-3518

SUMMARY OF THE INVENTION

Technical Problem

FIG. 2 illustrates an example of a transmission spectrum of an RGB coupler using a conventional mode coupler. Although a transmission band of R light (dotted line) satisfies the aforementioned condition sufficiently, transmission bands of B light (broken line) and G light (solid line) are narrow and the transmission band of G light, propagation loss of which falls within 1 dB merely has a width of approximately 25 nm. Therefore, there is a demand for an RGB coupler that multiplexes G light in a wide band while securing a band necessary for B light.

Means for Solving the Problem

It is an object of the present invention to provide an optical multiplexer that extends a transmission bandwidth of light and an RGB coupler that extends transmission bandwidths of blue (B) light and green (G) light using the optical multiplexer.

In order to attain such an object, an aspect of the present invention is an optical multiplexer constructed of a multimode waveguide to which two single mode input waveguides are connected at a distance and two single mode output waveguides connected at a distance to a surface opposite a surface to which the input waveguides of the multimode waveguide are connected, in which a width of the multimode waveguide is smaller than widths of the two input waveguides plus a distance between the input waveguides, and the input waveguides are connected to the multimode waveguide and the multimode waveguide is connected to the output waveguides via tapered waveguides, respectively.

Effects of the Invention

According to the present invention, it is possible to extend a transmission bandwidth of light by narrowing the width of the multimode waveguide.

BRIEF DESCRIPTION OF DRAWINGS

FIG. 10 is a diagram illustrating a region of the MMI applying a wave front matching method (WFM).

FIG. 15 is a diagram illustrating a structure of an RGB coupler according to a third embodiment of the present invention.

DESCRIPTION OF EMBODIMENTS

Hereinafter, embodiments of the present invention will be described in detail with reference to the accompanying drawings. First, a light coupler based on a multimode interferometer (multimode interference: MMI) will be described (see Non-Patent Literature 5).

Figure 3:
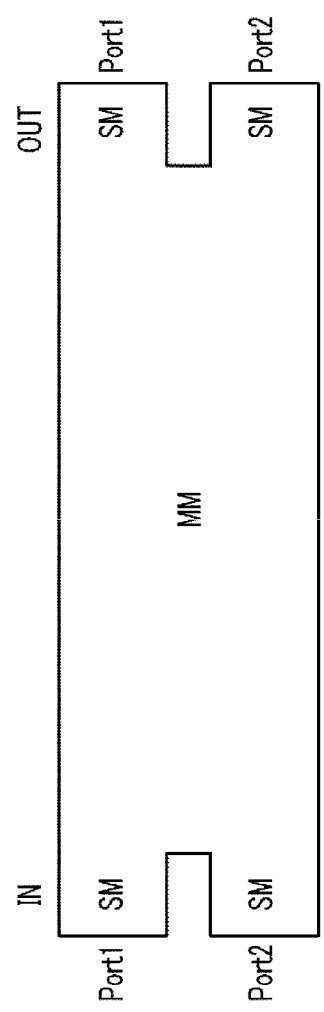
FIG. 3 is a diagram for describing basic principles of an MMI.

Basic principles of the MMI will be described with reference to FIG. 3. The MMI is constructed of a multimode (MM) waveguide to which two single mode (SM) input waveguides (IN) are connected and two single mode (SM) output waveguides (OUT) connected to a surface opposite a surface to which the input waveguides are connected.

Figure 4:
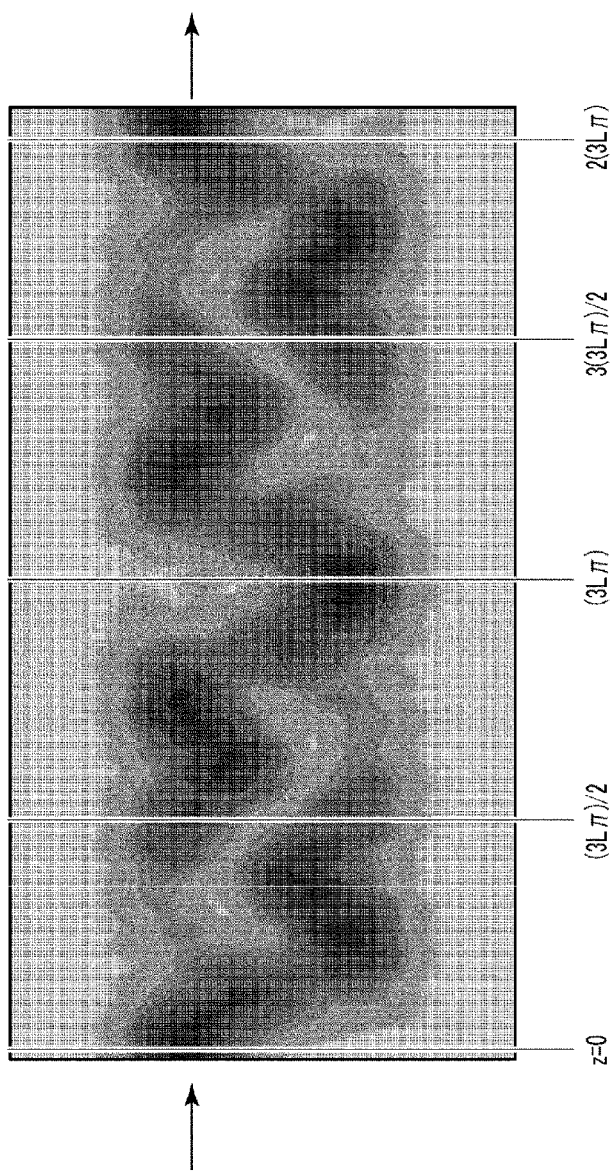
FIG. 4 is a diagram illustrating a light intensity pattern in a multimode (MM) waveguide of the MMI.

FIG. 4 illustrates a light intensity pattern in the MMI multimode (MM) waveguide. The light intensity expressed in gray scale is high in a black part and low in a light gray part. For example, light inputted from the Port 1 of the SM input waveguide is developed in different modes in the MM waveguide and repeats self-imaging due to a difference in propagation constants between the modes. A self-imaging length $L_\pi$ corresponding to one cycle of a periodic change in light intensity in a propagation direction of light is expressed by the following formula.

Formula 1

$$L_\pi = \frac{\pi}{\beta_0 - \beta_1} \cong \frac{4 n_r W_e^2}{3 \lambda_0} \quad (1)$$

Formula 2

$$W_e = W_M + \left(\frac{\lambda_0}{\pi}\right)\left(\frac{n_c}{n_r}\right)^{2\sigma} (n_r^2 - n_c^2)^{-\frac{1}{2}} \quad (2)$$

Where $\beta_n$: propagation constant of n-th order mode, $n_r$: refractive index of core, $n_c$: refractive index of clad, $W_e$: effective width of MM waveguide, $W_M$: waveguide width of MM waveguide, $\lambda_0$: wavelength, $\sigma$: 0(TE), 1(TM). An SM output waveguide is connected to a desired wave front in the MM waveguide. By connecting the Port 1 and Port 2 of the SM output waveguide (OUT) to, for example, $(3L\pi)/2$ in FIG. 4, the MM waveguide can be used as a two-branch splitter.

Figure 5:
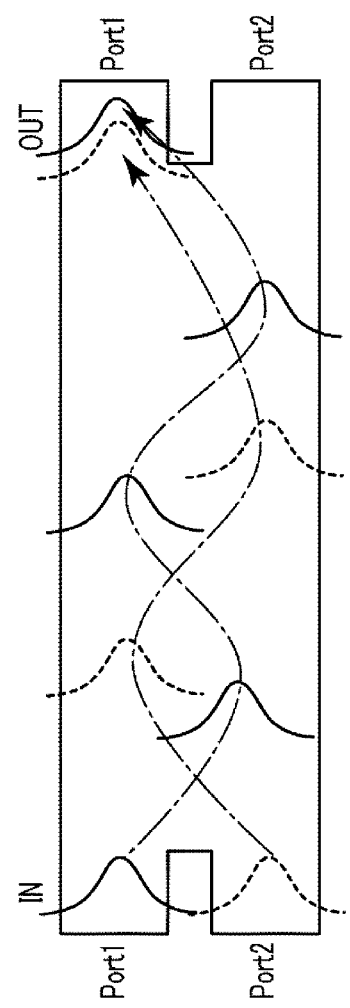
FIG. 5 is a diagram for describing principles of a wavelength multiplexer using the MMI.

The principles of the wavelength multiplexer using an MMI will be described with reference to FIG. 5. Since the self-imaging length $L_\pi$ has a wavelength dependency, the wavelength multiplexer is implemented by setting the length of the MM waveguide to an appropriate length. For example, when G light (solid line) is inputted to the Port 1 of the SM input waveguide (IN) and B light (broken line) is inputted from the Port 2 of the SM input waveguide (IN), the length of the MM waveguide is set to an integer multiple (4 times) of half cycle of the self-imaging length of G light and an integer multiple (3 times) of half cycle of the self-imaging length of B light. As a result, the G light and the B light are multiplexed and outputted from the Port 1 of the SM output waveguide (OUT).

First Embodiment

From Formulas (1) and (2), by balancing a change in the effective width $W_e$ of the MM waveguide and the wavelength $\lambda_0$, that is, according to:

Formula 3

$$\Delta \frac{W_e^2}{\lambda_0} = \text{constant} \quad (3)$$

A fluctuation in the self-imaging length $L_\pi$ when the wavelength changes is suppressed, and it is thereby possible to broaden a bandwidth. However, in a normal MMI, an increase in $W_e$ is gentle with respect to an increase in wavelength, and the $L_\pi$ decreases monotonously as the wavelength becomes longer. Therefore, the conventional design method cannot satisfy Formula (3).

The inventor et al. discovered that Formula (3) could be satisfied at a desired wavelength by narrowing the MM waveguide and using an increase in the $W_e$ by exudation of light. That is, the change in the $W_e$ with respect to the change in the wavelength no longer becomes monotonous, and it is thereby possible to obtain a region with little change in the self-imaging length and broaden a bandwidth.

Figure 6:
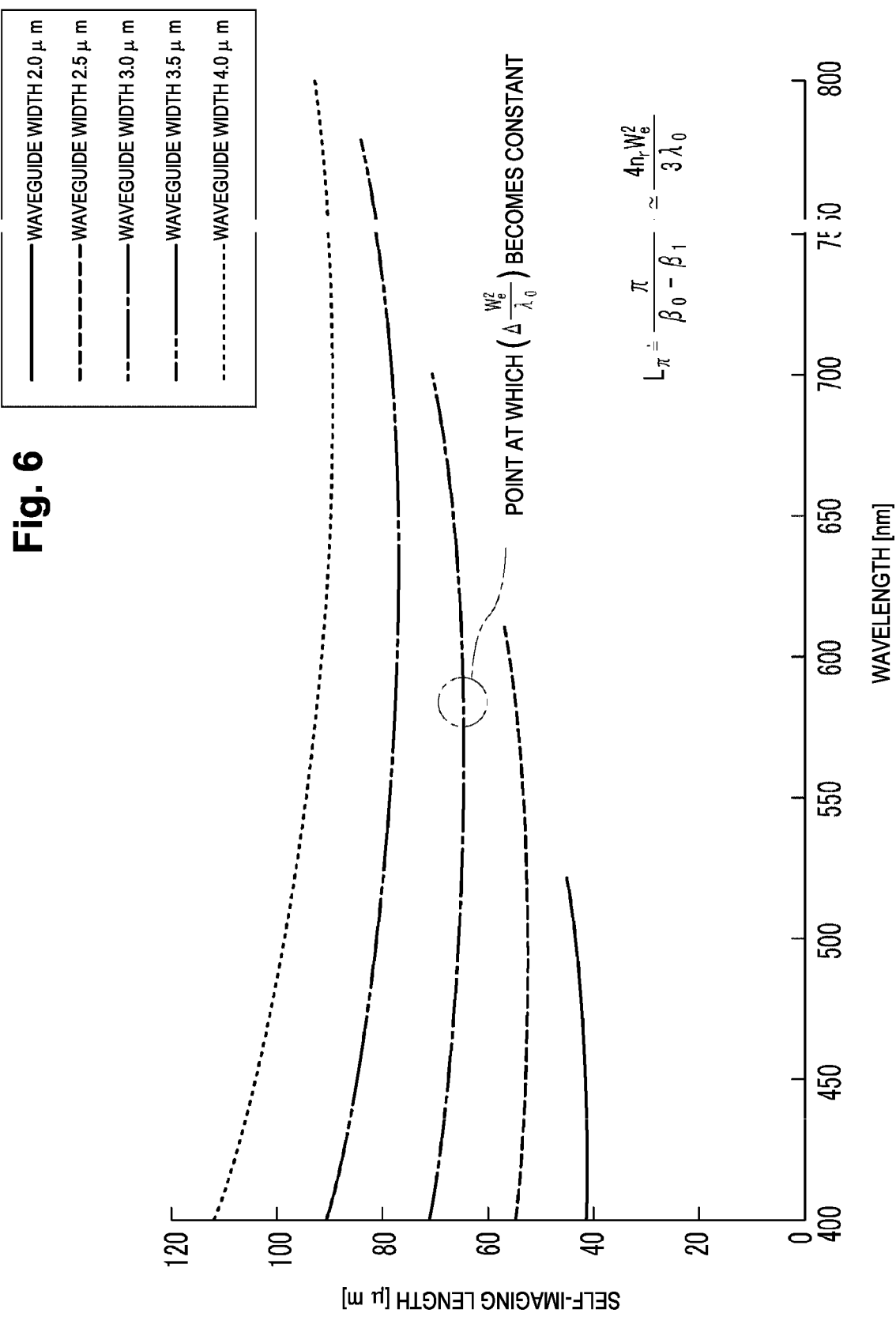
FIG. 6 is a diagram illustrating a relationship between a wavelength and a self-imaging length.

FIG. 6 illustrates a relationship between a wavelength and a self-imaging length. Since the MMI multiplexes light using a propagation constant difference between modes, even when the width of the MM waveguide is reduced, a waveguide width that allows at least two modes to be excited is necessary. Thus, 0-th order and first order propagation constants are obtained by numerical calculations when the effective width $W_e$ of the MM waveguide is changed and the relationship between the wavelength $\lambda_0$ and the self-imaging length $L_\pi$ was thereby calculated. The calculations were performed assuming that the thickness of the core film of the PLC constituting the MMI was 2.0 μm and the relative refractive index difference Δ was 0.77% and by changing the width of the MM waveguide. The results shown in FIG. 6 show that Formula (3) is satisfied at a wavelength near an inflexion point on a curve of each waveguide width.

Figure 7:
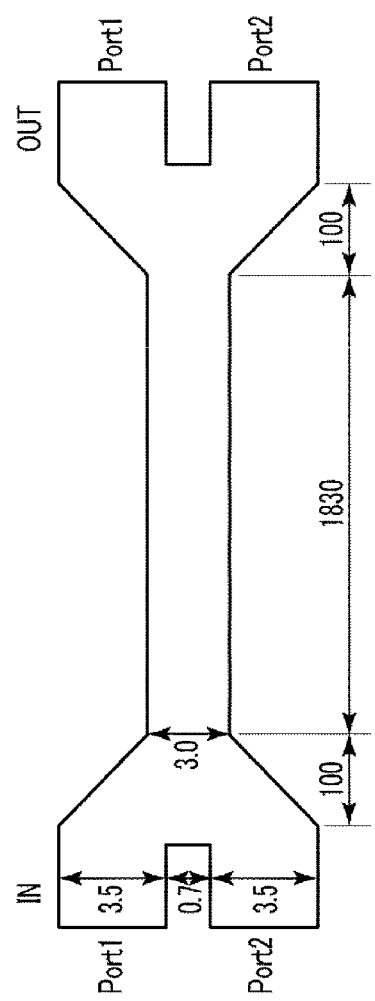
FIG. 7 is a diagram illustrating a structure of an MMI according to a first embodiment of the present invention.

FIG. 7 illustrates a structure of the MMI according to the first embodiment of the present invention. The MMI multiplexes G light and B light as in the case of the MMI shown in FIG. 5. The MMI is constructed of a multimode (MM) waveguide to which two single mode (SM) input waveguides (IN) are connected at a distance and two single mode (SM) output waveguides (OUT) connected at a distance to a surface opposite a surface to which the input waveguides of the multimode waveguide are connected. In FIG. 6, the width of the MM waveguide was assumed to be 3 μm as the waveguide width by assuming that an inflexion point is located near wavelength 600 nm between the wavelength of G light (523.5 nm) and the wavelength of R light (630 nm). This is because when an inflexion point is located near the wavelength of G light, a difference in the self-imaging length between B light (wavelength 467 nm) and G light is small, and so the length of the MM waveguide necessary to match the cycle of the self-imaging length becomes considerably long as described above.

The length of the MM waveguide was assumed to be 1830 μm. The width of the SM waveguide is 3.5 μm and the distance between the SM input waveguides and the distance between the SM output waveguides were assumed to be 0.7 μm. Since the width of the MM waveguide is smaller than the widths of the SM waveguides plus the distance between the SM waveguides, the SM input waveguides are connected to the MM waveguide, and the MM waveguide is connected to the SM output waveguides, respectively, via tapered waveguides having a length of 100 μm.

When G light is inputted to the Port 1 of the SM input waveguide (IN) and B light is inputted from the Port 2 of the SM input waveguide (IN), only 0-th order and first order modes of G light and B light are generated in the MM waveguide, and after repeating self-imaging, the G light and B light are multiplexed and outputted from the Port 1 of the SM output waveguide (OUT).

Figure 8:
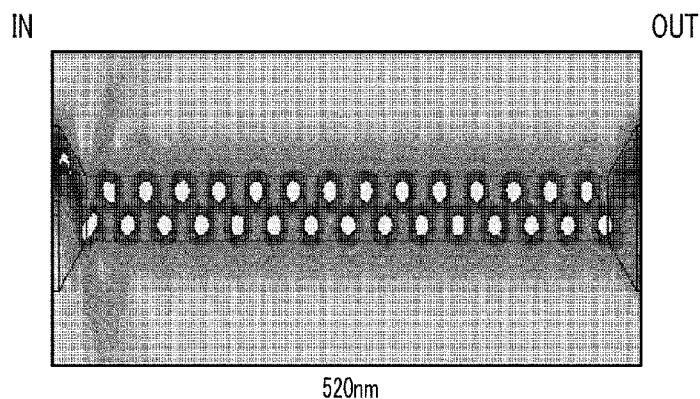
FIG. 8 is a diagram illustrating a light intensity pattern in the MMI according to the first embodiment.
Figure 8:
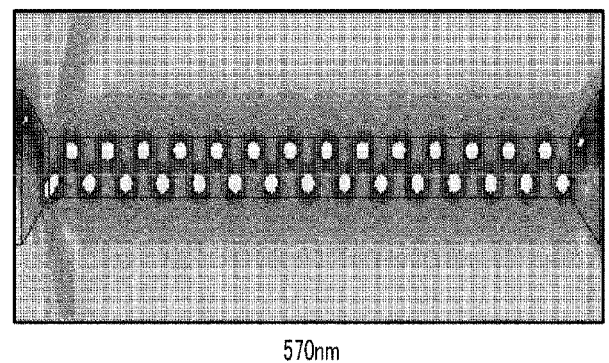
Figure 8:
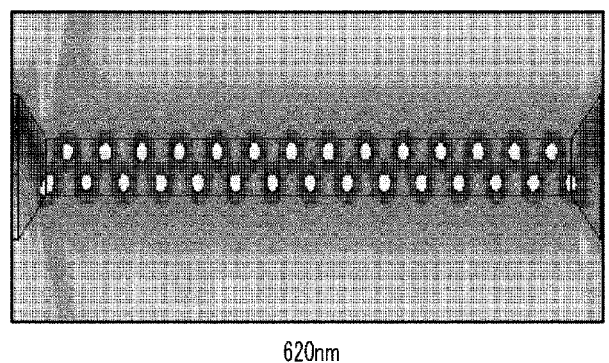

FIG. 8 illustrates a light intensity pattern in the MMI of the first embodiment. FIG. 8(a) illustrates a case of wavelength 520 nm, FIG. 8(b) illustrates a case of wavelength 570 nm and FIG. 8(c) illustrates a case of wavelength 620 nm. Light inputted from the Port 1 of the SM input waveguide (IN) repeats self-imaging and is outputted from the Port 1 of the SM output waveguide (OUT). At this time, the number of times self-imaging is executed is the same at all wavelengths.

Figure 9:
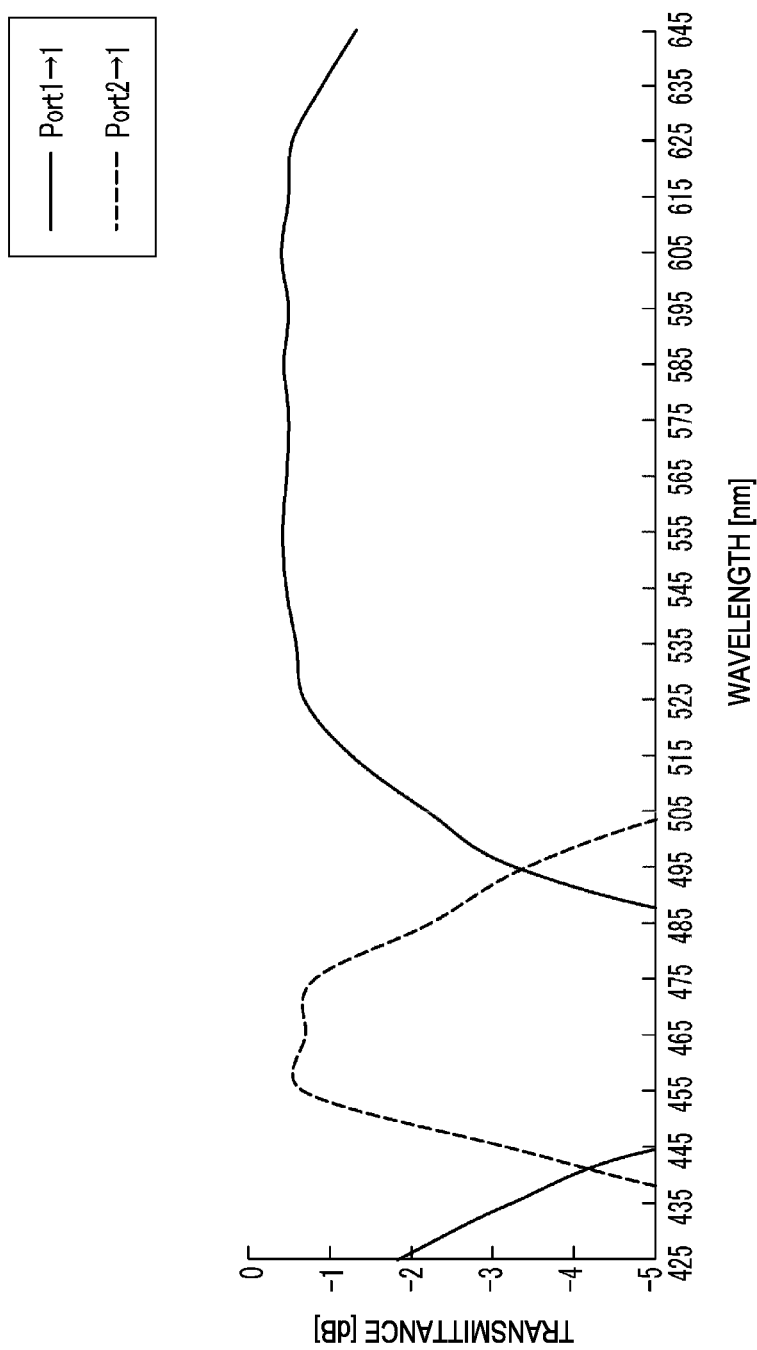
FIG. 9 is a diagram illustrating an example of a transmission spectrum of the MMI according to the first embodiment.

FIG. 9 illustrates an example of a transmission spectrum of the MMI according to the first embodiment. Propagation loss is approximately 1 dB or less at wavelengths 455 to 475 nm and wavelengths 520 to 635 nm. It is seen that the transmission band of G light (solid line) exhibits substantially the same transmission characteristics over the wavelength of R light. In this way, by narrowing the width of the MM waveguide and satisfying Formula (3) at a desired wavelength, it is possible to achieve an optical multiplexer with an extended transmission band.

The MMI shown in FIG. 7 has a broadened band from the wavelength of G light (523.5 nm) toward the long wavelength side, but has a shorter band toward a shorter wavelength side. Moreover, the width of the transmission band of B light (broken line) is also insufficient. Thus, an improvement of overall transmittance is achieved by changing a refractive index distribution of the MM waveguide along the light traveling direction. This technique can calculate a specific shape of the refractive index distribution, for example, by modulating the waveguide width using a wave front matching method (WFM) as described in Non-Patent Literature 6.

The WFM is a technique that determines a refractive index distribution (waveguide structure) so as to match the wave front of the light propagating from the input side (forward propagation) and the wave front of the light propagating from the output side (backward propagation) with respect to an optical circuit under a certain input/output condition (boundary condition). It is also a simulation technique that calculates a refractive index distribution that maximizes transmittance of a circuit with respect to a desired boundary condition and is a technique that has significant results in the PLC design.

To be more specific, to calculate a refractive index distribution for the purpose of improving transmittance using the WFM, a light beam having a desired input mode field is caused to propagate from an input end to the tapered waveguide from the SM input waveguide in the forward direction using, for example, a beam propagation method (BPM), a light beam having a desired output mode field is caused to propagate from an output end to the SM output waveguide from the tapered waveguide in the backward direction, and the width of the MM waveguide is changed so that the wave fronts of the two light beams match at any given point in the waveguide. By repeating this procedure a plurality of times, it is possible to determine a refractive index distribution that reduces propagation loss.

FIG. 10(a) illustrates a region of the MMI applying the wave front matching method. For initial refractive index distributions, that is, uniform refractive index distributions of the MM waveguide and the tapered waveguide, for example, the following boundary conditions are set. The 0-th order modes of wavelengths 500, 520 and 540 nm are set at the Port 1 of the SM input waveguide (IN), the 0-th order modes of wavelengths 430, 450, 470 and 490 nm are set at the Port 2 of the SM input waveguide (IN) and the 0-th order modes of the aforementioned 7 wavelengths are set at the Port 1 of the SM output waveguide (OUT) as boundary conditions. Forward propagations and backward propagations were repeated 10 times respectively in optimization using the WFM.

FIG. 10(b) illustrates results obtained by executing the WFM. By executing the WFM under the aforementioned boundary conditions, the waveguide width of the region to which the WFM is applied is modulated along the light traveling direction and a desired refractive index distribution is obtained.

Figure 2:
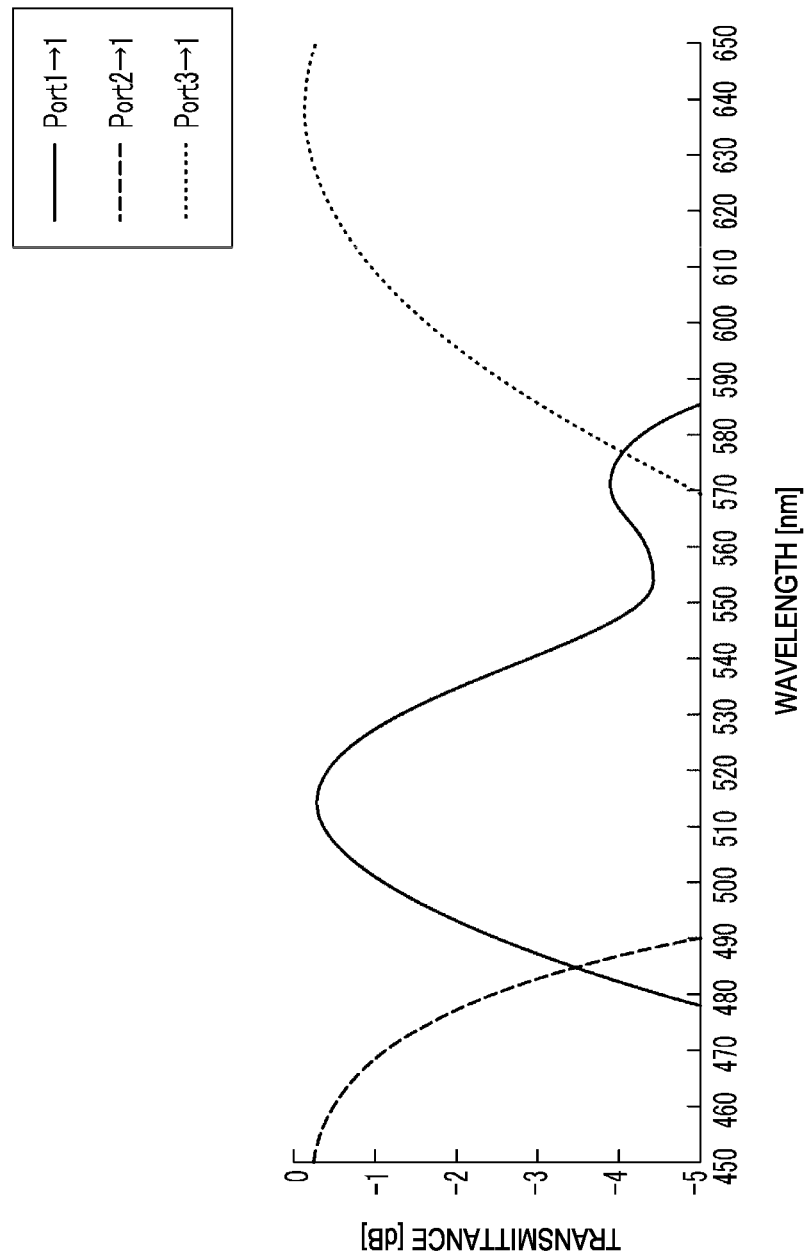
FIG. 2 is a diagram illustrating an example of a transmission spectrum of an RGB coupler using the conventional mode coupler.
Figure 11:
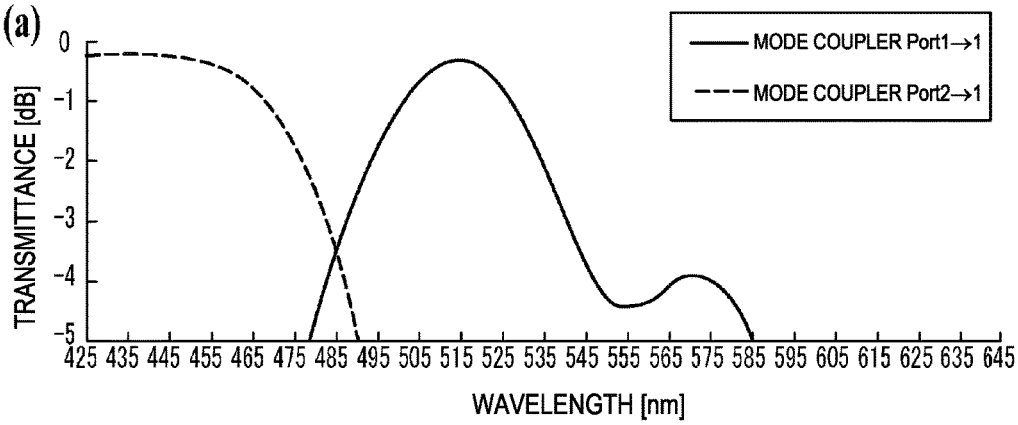
FIG. 11 is a diagram illustrating an example of a transmission spectrum of the MMI applying the WFM.
Figure 11:
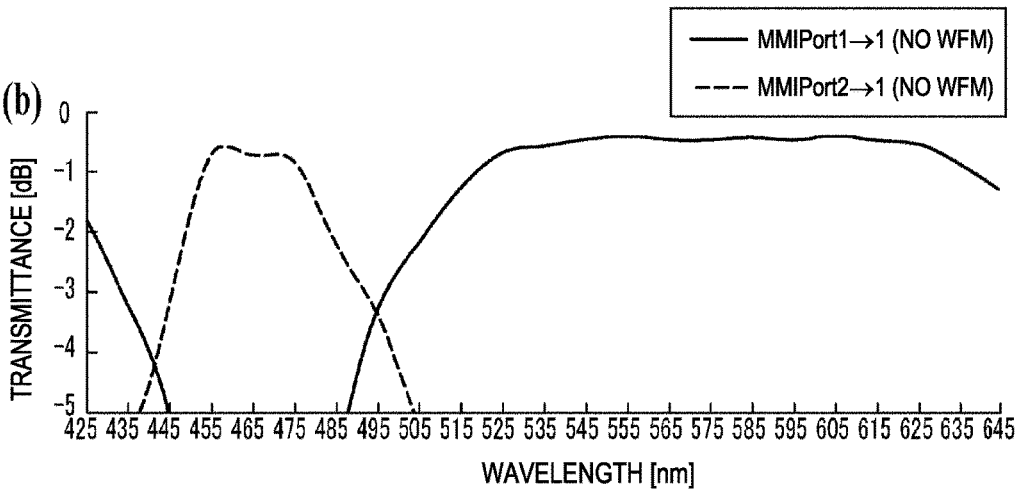
Figure 11:
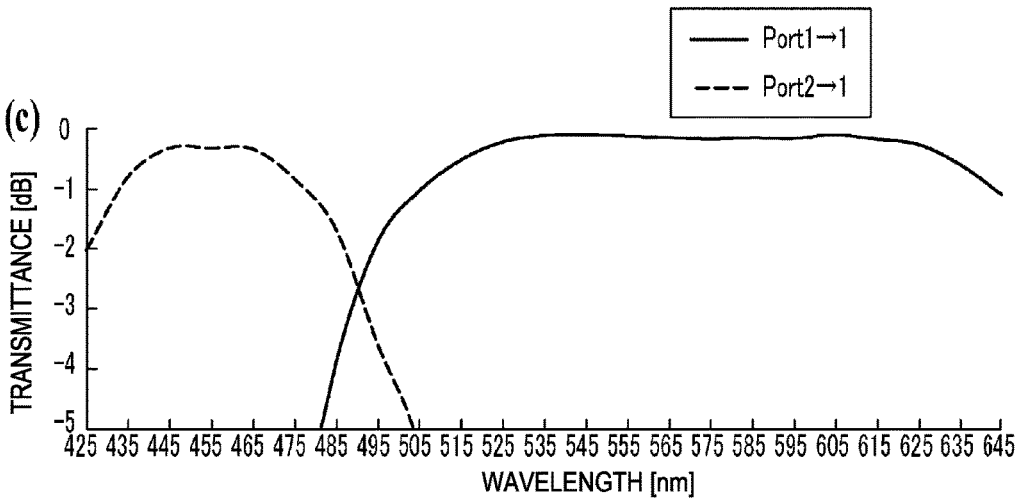

FIG. 11 illustrates an example of a transmission spectrum of the MMI applying the WFM. FIG. 11(a) is a transmission spectrum when the conventional mode coupler shown in FIG. 2 is used, FIG. 11(b) is a transmission spectrum of the MMI of the first embodiment shown in FIG. 9. FIG. 11(c) is a transmission spectrum of the MMI of the first embodiment to which the WFM is further applied.

It is seen that the WFM extends the transmission bands of G light (solid line) and B light (broken line) and also improves transmittance of the transmission bands.

The MMI to which the WFM is applied can achieve a GB coupler having a propagation loss of 1.0 dB or less at the aforementioned G: 523.5±18.5 nm and B: 467 nm±10 nm. Furthermore, through the modulation of the refractive index distribution by the WFM, it is considered that optimization is performed so as to increase a difference in self-imaging length depending on wavelengths and an effect of enabling the length of the MM waveguide to be shortened.

Figure 12:
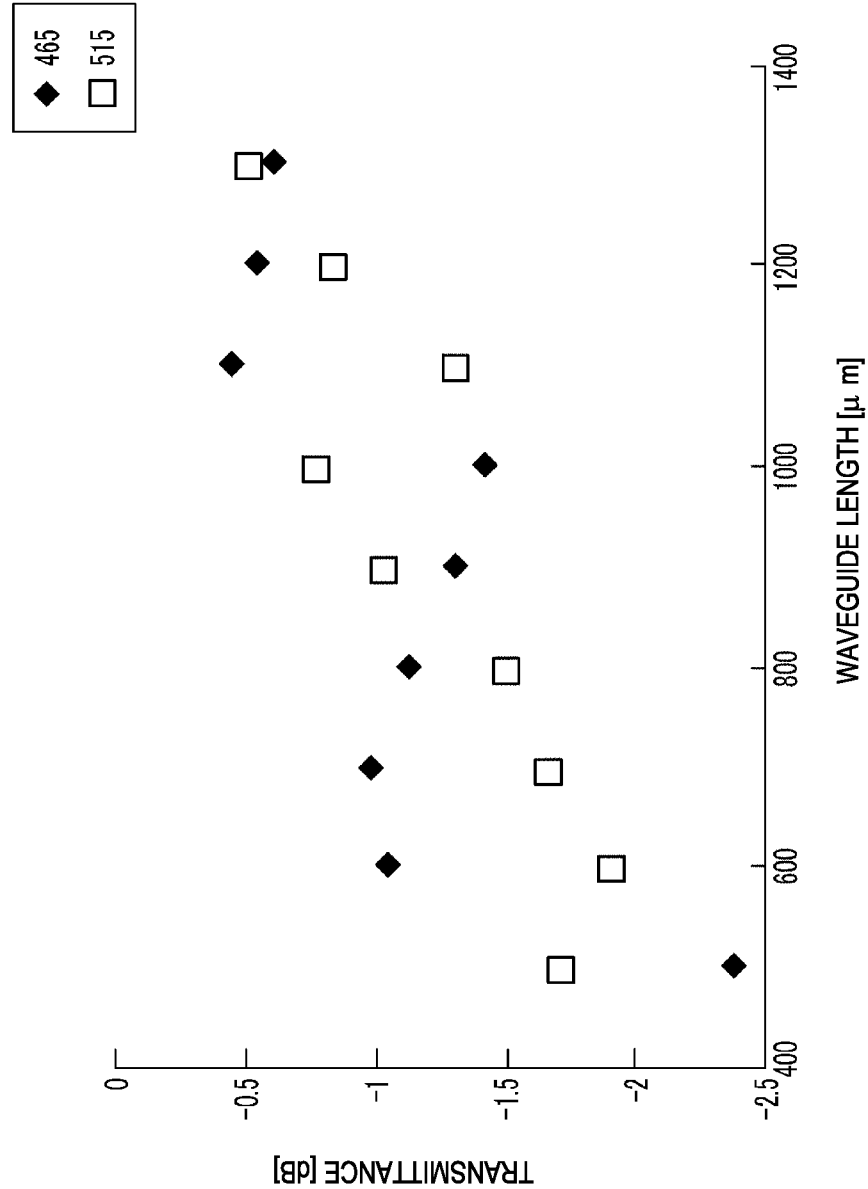
FIG. 12 is a diagram illustrating a relationship between a length and a transmittance of an MM waveguide.

FIG. 12 illustrates a relationship between a length and a transmittance of the MM waveguide. Since the length and the transmittance of the MM waveguide have a trade-off relationship, transmittances at wavelengths 465 nm and 515 nm when the WFM is executed by changing the length of the MM waveguide are illustrated respectively. Settings of the wavelengths and the configuration of the MMI shown in the present embodiment are examples and it goes without saying that the present invention is not limited to such numerical values.

Second Embodiment

Figure 1:
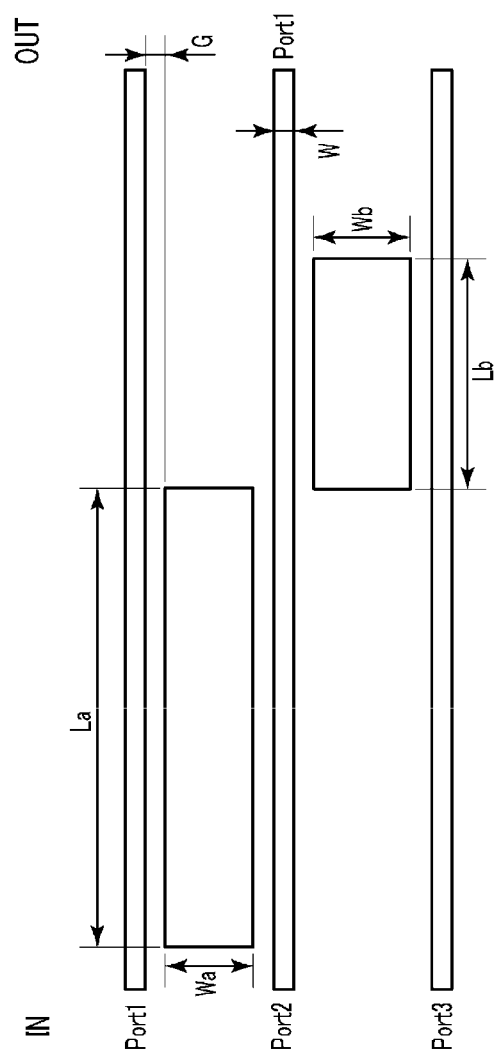
FIG. 1 is a diagram illustrating a configuration of an RGB coupler using a conventional mode coupler.
Figure 13:
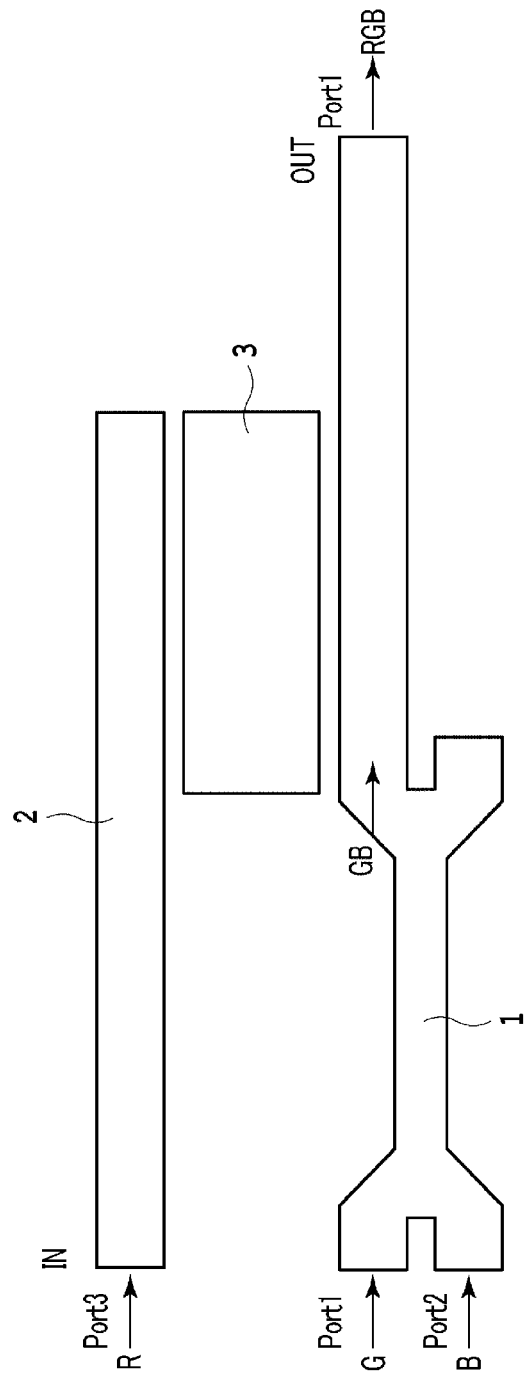
FIG. 13 is a diagram illustrating a structure of an RGB coupler according to a second embodiment of the present invention.

FIG. 13 illustrates a structure of an RGB coupler according to a second embodiment of the present invention. Assuming the MMI shown in the first embodiment as a GB coupler 1, a waveguide 2 and a mode coupler 3 for multiplexing R light are disposed in the subsequent stage. A configuration of the mode coupler 3 is the same as the configuration of the mode coupler B shown in FIG. 1 (see Non-Patent Literature 4).

Figure 14:
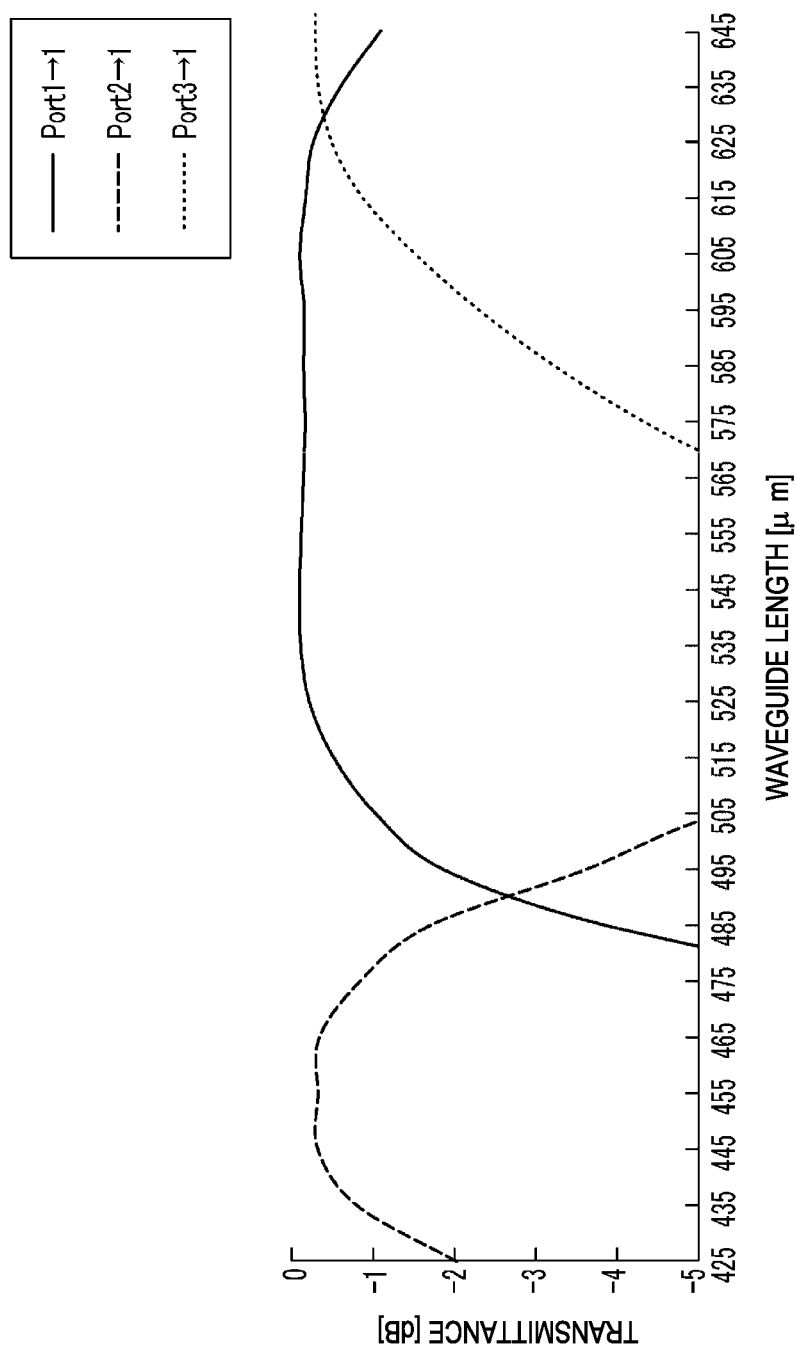
FIG. 14 is a diagram illustrating an example of a transmission spectrum of an RGB coupler according to the second embodiment.

FIG. 14 illustrates an example of a transmission spectrum of the RGB coupler according to the second embodiment. R light (dotted line), B light (broken line) and G light (solid line) can achieve respective RGB couplers having a propagation loss of 1 dB or less and desired transmission bands at the aforementioned R=630±10 nm, G=523.5±18.5 nm and B=467±10 nm.

Third Embodiment

FIG. 15 illustrates a structure of an RGB coupler according to a third embodiment of the present invention. By assuming the MMI shown in the first embodiment as a GB coupler 1 and disposing a waveguide 2 and a directional coupler 4 for multiplexing R light in the subsequent stage, it is also possible to achieve an RGB coupler.

REFERENCE SIGNS LIST

1 GB coupler
2 waveguide
3 mode coupler
4 directional coupler

The invention claimed is:

1. An optical multiplexer comprising:
a multimode waveguide to which two single mode input waveguides are connected at a distance; and
two single mode output waveguides connected at a distance to a surface opposite a surface to which the input waveguides of the multimode waveguide are connected, wherein
a width of the multimode waveguide is smaller than widths of the two input waveguides plus a distance between the input waveguides, and
the input waveguides are connected to the multimode waveguide via input tapered waveguides and the multimode waveguide is connected to the output waveguides via output tapered waveguides,
wherein the width of the multimode waveguide is set so that a change amount of the multimode waveguide with respect to a wavelength of an effective width becomes constant at a desired wavelength.

2. The optical multiplexer according to claim 1, wherein light of a first wavelength inputted to one of the input waveguides and light of a second wavelength inputted to an other of the input waveguides generate only 0-th order and first order modes in the multimode waveguide and repeat self-imaging.

3. The optical multiplexer according to claim 1, wherein widths of the multimode waveguide and the input and output tapered waveguides change along a light propagation direction,
wherein when a light beam having a desired input mode field is caused to propagate from an input end of the input waveguides to the input tapered waveguides in a forward direction, and a light beam having a desired output mode field is caused to propagate from the output tapered waveguides to an output end of the output waveguides in a backward direction, the width of the multimode waveguide is changed so that wave fronts of the two light beams match at any given point in the multimode waveguide.

4. The optical multiplexer according to claim 1, wherein light of first wavelength inputted to one of the input waveguides is blue light having a wavelength of 467±10 nm and light of second wavelength inputted to another of the input waveguides is green light having a wavelength of 523.5±18.5 nm.

5. An RGB coupler comprising:
the optical multiplexer according to claim 4; and
a mode coupler connected to one of the output waveguides, wherein red light of 630±10 nm, which is light of a third wavelength is inputted to an input waveguide coupled with the mode coupler.

6. An RGB coupler comprising:
the optical multiplexer according to claim 4; and
a directional coupler connected to one of the output waveguides, wherein red light of 630±10 nm, which is light of a third wavelength is inputted to an input waveguide of the directional coupler.

7. The optical multiplexer according to claim 2, wherein widths of the multimode waveguide and the input and output tapered waveguides change along a light propagation direction,
wherein when a light beam having a desired input mode field is caused to propagate from an input end of the input waveguides to the input tapered waveguides in a forward direction, and a light beam having a desired output mode field is caused to propagate from the output tapered waveguides to an output end of the output waveguides in a backward direction, the width of the multimode waveguide is changed so that wave fronts of the two light beams match at any given point in the multimode waveguide.

8. The optical multiplexer according to claim 2, wherein light of first wavelength inputted to one of the input waveguides is blue light having a wavelength of 467±10 nm and light of second wavelength inputted to another of the input waveguides is green light having a wavelength of 523.5±18.5 nm.

9. The optical multiplexer according to claim 3, wherein light of first wavelength inputted to one of the input waveguides is blue light having a wavelength of 467±10 nm and light of second wavelength inputted to another of the input waveguides is green light having a wavelength of 523.5±18.5 nm.

* * * * *